US007441406B2

(12) United States Patent
Stingl

(10) Patent No.: US 7,441,406 B2
(45) Date of Patent: Oct. 28, 2008

(54) FLUID CIRCUIT AND INDUSTRIAL TRUCK HAVING A FLUID CIRCUIT

(75) Inventor: Konrad Stingl, Altfraunhofen (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 11/205,069

(22) Filed: Aug. 17, 2005

(65) Prior Publication Data

US 2006/0037470 A1 Feb. 23, 2006

(30) Foreign Application Priority Data

Aug. 17, 2004 (DE) ...................... 10 2004 039 848

(51) Int. Cl.
*F16D 31/02* (2006.01)
*F15B 11/08* (2006.01)

(52) U.S. Cl. ............................. 60/414; 60/454; 91/444

(58) Field of Classification Search .................. 60/414, 60/454; 91/444, 449, 454
See application file for complete search history.

(56) References Cited

U.S. PATENT DOCUMENTS 3,842,943 A * 10/1974 Nakamura et al. ............ 91/454
4,745,743 A * 5/1988 Boulanger .................. 60/454
5,355,773 A * 10/1994 Winkels ...................... 91/454
6,305,264 B1 * 10/2001 Yang et al. .................... 91/447
6,837,045 B2 * 1/2005 Heusser ...................... 91/454

FOREIGN PATENT DOCUMENTS

| | | |
|---|---|---|
| DE | 94 15 062.1 | 1/1995 |
| DE | 296 17 922 U1 | 1/1997 |
| DE | 44 23 644 C2 | 10/1998 |
| EP | 1 052 215 A2 | 4/2000 |

* cited by examiner

*Primary Examiner*—Michael Leslie
(74) *Attorney, Agent, or Firm*—Rothwell, Figg, Ernst & Manbeck, P.C.

(57) ABSTRACT

The invention relates to a fluid circuit for load displacement, having a fluid supply line for conveying fluid from a fluid tank by means of a fluid pump to at least one fluid store of a consumer, and having a fluid return line, through which fluid can be returned, driven by the consumer, from the store to the tank, a valve being provided in the fluid supply line which allows a fluid supply flow to pass through from the tank to the store and blocks a fluid return flow from the store to the tank, the fluid circuit also comprising at least one switchable valve which can be switched between a return flow passage position and a return flow blocking position, and being distinguished by the fact that the switchable valve is in that section of the fluid return line which is separate from the fluid supply line.

11 Claims, 2 Drawing Sheets

FLUID CIRCUIT AND INDUSTRIAL TRUCK HAVING A FLUID CIRCUIT

The present invention relates to a fluid circuit having a fluid supply line, through which a fluid can be conveyed from a fluid tank by means of a fluid pump to at least one fluid store of a consumer, and having a fluid return line, through which fluid can be returned, driven by the consumer, from the at least one fluid store via the fluid pump to the fluid tank, a valve being provided in the fluid supply line, which valve allows fluid to pass through depending on the flow direction, allows a fluid supply flow to pass through from the fluid tank to the fluid store and blocks a fluid return flow from the fluid store to the fluid tank, the fluid circuit also comprising at least one switchable valve which can be switched between a return flow passage position in which it allows a fluid return flow to pass through and a return flow blocking position in which it blocks a fluid return flow, the fluid circuit containing a fluid filter. The present application also relates to a switching block which implements such a fluid circuit as a preassembled assembly or an assembly which can be preassembled and to an industrial truck having such a fluid circuit.

Fluid circuits of the generic type and industrial trucks having such a design are known in the prior art. Generic fluid circuits are in this case primarily used as a hydraulic circuit for adjusting hydraulic cylinders as a drive for load-accommodating means and load displacement means on industrial trucks. In the generic fluid circuit, there is flow through a pump motor for driving the pump only for the purpose of producing a fluid supply flow. The force required to produce a fluid return flow is provided by the consumer.

Figure 1:
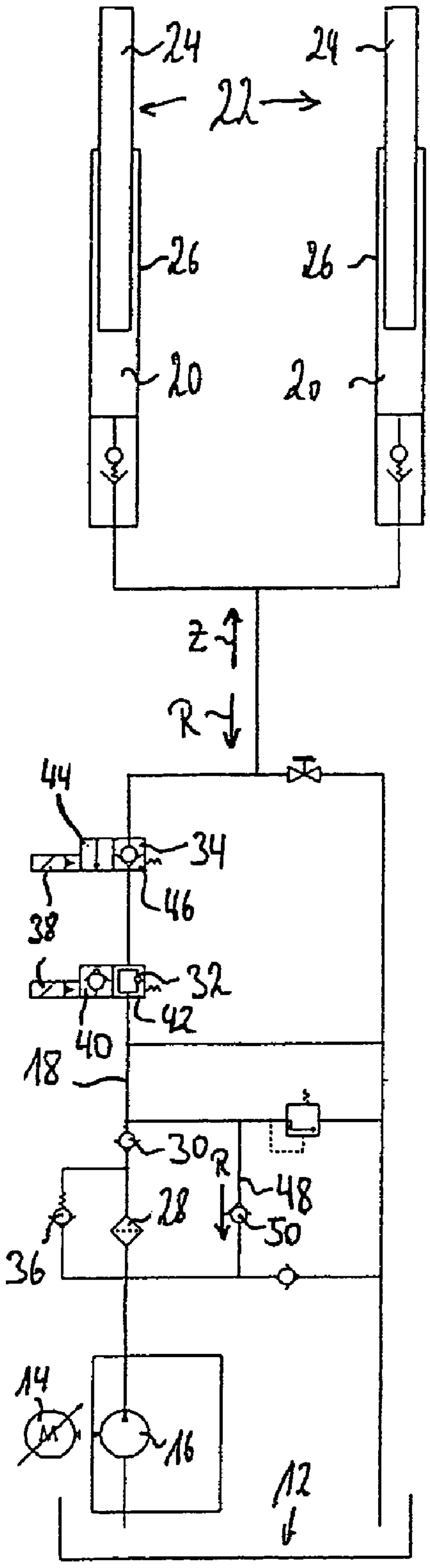
Prior art Fig. 1

A generic fluid circuit of the prior art is illustrated in FIG. 1. FIG. 1 shows a fluid tank 12 from which a pump 16 operated by a motor 14 conveys hydraulic oil via a fluid line 18 along a fluid supply flow direction Z into the fluid store 20 of hydraulic piston/cylinder arrangements 22 in order to provide the necessary fluid pressure there for moving the piston 24 out of the cylinder 26 of the piston/cylinder unit 22.

The hydraulic oil flowing in the fluid supply flow direction Z in the fluid line 18 flows, in the supply flow direction Z, firstly through an oil filter 28, then a nonreturn valve 30, a first switchable valve 32 and a second switchable valve 34. Connected in fluidic parallel with the filter 28 is a safety valve 36 which allows hydraulic oil to pass through in the supply flow direction Z when the oil pressure at that end of the safety valve 36 which is nearer to the pump exceeds a predetermined threshold pressure. This may be the case, for example, when there is a blockage in the filter 28.

The switchable valves 32 and 34 can be adjusted between two positions by electrical actuators 38. The first switching valve 32, in a position which is illustrated as nonactive in FIG. 1, comprises a nonreturn valve 40 which blocks in the supply flow direction Z and allows fluid to pass through in the return flow direction R. Furthermore, the first switching valve 32 comprises a valve 42 which is illustrated as active in FIG. 1, allows fluid to pass through depending on the pressure and direction and comprises a control nozzle and a valve which is fluidically in parallel with said control nozzle. The switchable valve 32 can be prestressed by spring force into the position shown in FIG. 1. The valve always blocks in the return flow direction R and allows a fluid flow to pass through in the supply flow direction Z depending on the hydraulic pressure present at the control nozzle.

In the position shown in FIG. 1 of the first switchable valve 32, into which position said switchable valve 32 is prestressed by spring prestress, hydraulic oil can be conveyed into the fluid store 20 in the supply flow direction Z for the purpose of moving the pistons 24 out of the cylinders 26.

The second switchable valve 34 can be moved into two different positions, as the first switchable valve 32. In the first position illustrated as nonactive in FIG. 1, the switchable valve 34 only has a hydraulic oil passage 44. In the other position illustrated as active in FIG. 1, into which position the second switchable valve 34 is prestressed by spring prestress, the valve 34 has a nonreturn valve 46 which allows fluid to pass through in the supply flow direction Z and blocks in the return flow direction R.

The hydraulic circuit of the prior art in FIG. 1 comprises a fluid return line section 48 which bypasses the nonreturn valve 30, blocking in the return flow direction R, and the filter 28. In the fluid return line section, the hydraulic fluid flows only in the return flow direction R.

In the hydraulic circuit in the prior art, it is possible for the pistons 24 to be extended out of the cylinders 20 when, in the case of a motor-operated pump 16, the first switchable valve 32 and the second switchable valve 34 are located in the positions shown in FIG. 1, i.e. the partial valves 42 and 46 lie in the fluid line 18. In this case, hydraulic oil can pass through the partial valve 42 in the supply flow direction Z and can likewise pass through the nonreturn valve 46 of the second switchable valve 34. These two partial valves 42 and 46 of the switchable valves 32 and 34 ensure, in a redundant manner, that the pressure which was once set in the fluid stores 20 of the hydraulic piston/cylinder units 22 is maintained.

Lowering, i.e. withdrawal of the pistons 24 into the cylinders 26 can take place when both the first switchable valve 32 and the second switchable valve 34 are adjusted such that the partial valves 40 and 44 lie in the fluid line 18. In this case, hydraulic oil flows, driven by the pistons 24 which, owing to their intrinsic weight and the weight of a possibly accommodated load, increase the pressure in the fluid stores 20, from the fluid stores 20 of the piston/cylinder units 22 in the return flow direction R successively through the second switchable valve 34, the first switchable valve 32, the return line 48 with the nonreturn valve 50, which allows fluid to pass through in the return flow direction R and blocks in the supply flow direction Z, and through the pump 16 to the fluid tank 12.

One disadvantage of this prior art is the fact that the pump needs to overcome numerous points of flow resistance in the form of filters and valves when the fluid is conveyed in a supply flow direction, which impairs the efficiency of the hydraulic system. It is therefore one object of the invention to provide a fluid circuit for supplying working fluid from a fluid tank to at least one fluid store of a consumer and to return working fluid from the at least one fluid store of the consumer to the fluid tank, with which circuit a high degree of efficiency of the hydraulic system can be achieved.

This object is achieved according to the invention by a fluid circuit, in particular an industrial truck, of the type mentioned initially, in which the fluid return line is formed separately from the fluid supply line at least in sections, the at least one switchable valve and the fluid filter being provided in that section of the fluid return line which is separate from the fluid supply line, the switchable valve being arranged downstream of the fluid filter in the fluid return flow direction, with the result that fluid flowing in the fluid return line to the fluid tank first flows through the fluid filter and then the switchable valve or possibly further valves.

Owing to the provision of the valve in the fluid supply line, which valve allows fluid to pass through depending on the flow direction, it is possible to ensure that working fluid which has been conveyed from the fluid tank to the consumer does not flow in an undesirable manner back to the fluid tank once the pump drive has been switched off driven by the pressure prevailing in the fluid store of the consumer.

Owing to the further provision of a switchable valve which is arranged downstream of the fluid filter in the return branch and through which, depending on the switching position, working fluid can or cannot flow from the fluid store of the consumer to the fluid tank, optionally working fluid can be passed out of the fluid store of the consumer. The fact that this switchable valve is not in a common supply and return line, as in the prior art, but is arranged in a fluid return line section formed separately from a fluid supply line reduces the number of valves through which the working fluid needs to flow when flowing driven by the pump and thus the number of points of flow resistance consuming pumping power in the fluid supply line. Using the same conveying pump as in the prior art, it is thus possible to achieve a high useful power or the same useful power with a smaller or less powerful conveying pump.

The design according to the invention and described above of the fluid circuit is a precondition for a particularly advantageous development. This advantageous development makes it possible for that section of the fluid supply line which is formed separately from the fluid return line, preferably the entire fluid line through which fluid flows in the supply flow direction from the pump to the fluid stores of the consumer, apart from the abovementioned valve which allows fluid to pass through depending on the flow direction, for example in the form of a nonreturn valve, and apart from the unavoidable fluid line resistance, to be free from further flow resistance. The flow losses consuming pumping power are therefore considerably reduced in the fluid supply line, with the result that an even larger proportion of the pumping power is available as useful power than was previously the case.

In order to clean and thus to increase the service life of the working fluid used, the fluid filter is provided in that section of the fluid return line which is formed separately from the fluid supply line. The filter is in an optimal position here since it can effectively filter out dirt introduced into the line system by the consumers and thus protect the switchable valves. The flow resistance brought about by this filter is therefore not effective in the pump-driven fluid supply flow but only in the consumer-driven fluid return flow. No pumping power is therefore required for overcoming the flow resistance.

In order to prevent the filter from preventing a fluid return flow and thus no longer making possible operation of the fluidically actuated consumers, in the event of failure, for example in the event of a blockage owing to filter cakes which have grown too large, a bypass line which bypasses the filter may be provided in which an emergency valve is arranged which allows a fluid return flow to pass through when the pressure difference between the valve end nearer to the fluid store and the valve end nearer to the fluid tank exceeds a predetermined threshold pressure and otherwise blocks a fluid flow.

In contrast to the prior art, the fluid filter is not provided in the fluid supply line but in the fluid return line. Fluid is thus initially supplied to the consumers unfiltered. However, since the fluid is conveyed in a circuit between the fluid tank and the fluid store, when considered over a long period of time, substantially the same filtering performance is achieved as in the prior art.

In order to be able to return fluid, driven by the consumer, in a targeted manner from the at least one fluid store of the consumer to the fluid tank, the at least one switchable valve, in its return flow passage position, may have a control nozzle and a nonreturn valve which is parallel to said control nozzle and allows fluid to pass through in the return flow direction in dependence on the fluid pressure prevailing at the control nozzle.

A further advantage of the present invention consists in the fact that the fluid return line section which is formed separately from the fluid supply line can also be used, during emergency operation, as a fluid supply line, with the result that a redundant option for supplying fluid to the fluid store of the at least one consumer is provided in contrast to the prior art. This is possible when the at least one switchable valve, in its return flow blocking position and as an emergency actuation valve, allows a fluid supply flow to pass through and blocks a fluid return flow.

In order to achieve further objects, a second valve, which can be switched between at least two positions, may be provided in that section of the fluid return line which is formed separately from the fluid supply line. Such a second valve is primarily useful when safety-relevant redundancy is intended to be provided for the case of emergency operation in the fluid circuit.

It is thus possible for the second switchable valve to be switched between a supply flow passage position in which it allows a fluid supply flow to pass through and a supply flow blocking position in which it blocks a fluid supply flow in order to provide a redundant emergency actuation option for the at least one consumer. For this purpose, the second switchable valve, in its supply flow blocking position and as an emergency outlet valve, may allow a fluid return flow to pass through and block a fluid supply flow. This may be achieved in design terms in the simplest case by a nonreturn valve. Furthermore, the second switchable valve, in its supply flow passage position, may have an emergency actuation control nozzle and an emergency actuation nonreturn valve which is parallel to said emergency actuation control nozzle and allows fluid to pass through in the supply flow direction in dependence on the fluid pressure prevailing at the control nozzle, for the purpose of providing a redundant emergency actuation option.

With such a design, it is possible, owing to the targeted optional arrangement of the two switchable valves described, for fluid to be supplied to the at least one fluid store of the consumer and to be let out from said fluid store of the consumer via the fluid return line section formed separately from the fluid supply line. Faulty operation of one switchable valve can in this case, under certain circumstances, be brought under control by the redundancy provided by the respective other valve operating without faults, with the result that the faulty operation, for example an undesired setting of one of the switchable valves to a return flow passage position, cannot lead to undesired return flow of fluid to the fluid tank. As a result, the separately formed section of the fluid return line can be used as a useful emergency supply line in the event of failure of the fluid supply line.

In a manner known per se, the fluid circuit may also comprise, in addition to the above-described valves and the filter, a pressure-limiting device which is designed to limit the pressure in the fluid lines to a predetermined pressure value. Furthermore, the above-described fluid circuit may have a manual outlet valve in order to let out fluid manually from the fluid store of the at least one consumer towards the fluid tank, for example in the event of complete failure of the valve control.

The above-described fluid line may be operated using any desired fluids, for example using gas. However, the fluid is preferably a hydraulic fluid, such as a hydraulic oil, since considerably greater consumer performance can be achieved with fluids at the same conveyor pump power. The above-described fluid circuit is particularly preferably conceived as a hydraulic circuit for a hydraulic load displacement system of an industrial truck. The fluid circuit according to the invention as an industrial truck hydraulic circuit allows, as has already been described above, the industrial truck either to be provided with a pump motor having a lower power without any lifting power loss or to be provided with a higher useful power yield compared with the prior art with the same pump motor.

In a particularly advantageous manner, the above-described fluid circuit, in particular as a hydraulic circuit for a load displacement device of an industrial truck, can be realized as a preassembled switching block or a switching block which can be preassembled, the switching block comprising:

a first fluid line section, a second fluid line section which is separate from the first fluid line section, a valve being provided in the first fluid line section, which valve allows fluid to pass through depending on the flow direction, allows a fluid flow to pass through in a first flow direction and blocks a fluid flow in a second flow direction which is opposite to the first flow direction, at least one switchable valve being provided in the second fluid line section, it being possible for said valve to be switched between a passage position in which it allows a fluid flow to pass through in the second flow direction, and a blocking position in which it blocks a fluid flow in the second flow direction.

The fluid line sections provided in the switching block, of which the first fluid line section corresponds to a fluid supply line section described above and of which the second fluid line section corresponds to a separately formed fluid return line section described above, can be developed with further features of the above-described fluid circuit.

Since the above-described fluid circuit, in particular when realized in a preassembled switching block or a switching block which can be preassembled, as a hydraulic circuit provides an industrial truck with particular value, separate protection for an industrial truck having a load displacement device and having an above-described fluid circuit for its operation is also desired. In this case, an industrial truck is particularly preferred which has an above-described switching block as a preassembled assembly or an assembly which can be preassembled.

Figure 2:
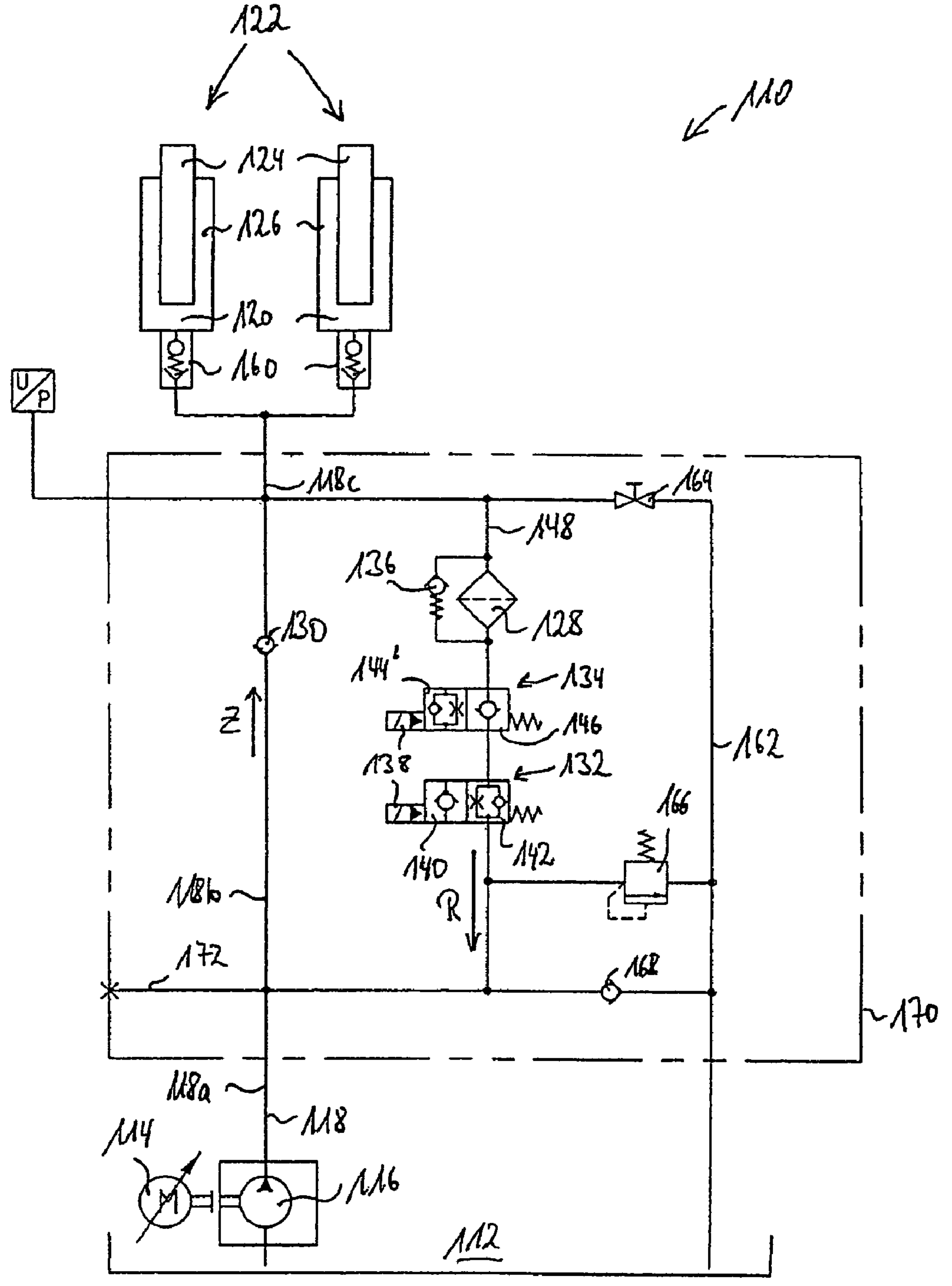

The present invention will be described in more detail below with reference to the attached FIG. 2. FIG. 2 shows an advantageous embodiment of the present invention schematically using a hydraulic circuit diagram.

Identical or functionally identical components to those in FIG. 1 explaining the prior art are provided in FIG. 2 with the same references, but increased by the number 100. In order to explain the function of these components, express reference is made to the description given above relating to FIG. 1.

In FIG. 2, a load displacement device having an embodiment of a fluid circuit according to the invention in the form of a hydraulic circuit is overall given the reference 110.

The hydraulic oil conveying pump 116 operated by the motor 114 conveys hydraulic oil from the hydraulic oil tank 112 into the hydraulic line 118. The hydraulic line 118 comprises the three sections 118*a*, 118*b* and 118*c*. The sections 118*a* and 118*c* of the hydraulic line 118 have hydraulic oil flowing through them during normal operation of the hydraulic circuit both in the supply flow direction Z and in the return flow direction R. The hydraulic line section 118*b*, on the other hand, only has hydraulic oil flowing through it in the supply flow direction Z owing to the action of the nonreturn valve 130.

Connected in parallel in terms of flow with this hydraulic oil supply line section 118*b* is a hydraulic oil return line section 148 formed separately from the supply line section 118*b*. This return line section 148 has hydraulic oil flowing through it during normal operation of the hydraulic circuit only in the return flow direction R, but may have hydraulic oil flowing through it during emergency operation in the supply flow direction Z as well owing to the suitable position of the electrically switchable valves 132 and 134.

The valves 132 and 134 which can be switched by electrical actuators 138 correspond in terms of their function to the switchable valves 32 and 34 described in FIG. 1. Only in place of the passage 44 does the switchable valve 134 have a flow element 144' comprising a control nozzle and a valve, which is parallel to said control nozzle, allows fluid to pass through depending on the flow direction, always blocks in the supply flow direction Z and allows fluid to pass through in the return flow direction depending on the pressure present at the control nozzle. In contrast to merely the passage 44, the flow element 144' in FIG. 2 may allow hydraulic oil to pass through in the return flow direction R as well, but blocks in the supply flow direction Z.

Located between the pump 116 and the consumers 122, which are connected in parallel in terms of flow, to be more precise their line breakage safety valves 160, in the hydraulic oil supply line 118*a*, 118*b* and 118*c* is, as the single flow resistance in addition to the unavoidable line resistance, the nonreturn valve 130 which ensures that a pressure produced in the fluid stores 120 of the consumers 122 does not break down in an undesirable manner over the fluid supply line once the pump 116 has been switched off.

The overall control of the hydraulic oil return from the hydraulic oil stores 120 of the consumers 122 to the hydraulic oil tank 112 takes place by means of correspondingly switching the valves 132 and 134 in the hydraulic oil return line section 148. In the positions of the valves 132 and 134 shown in FIG. 2 in which the valves 132 and 134 are located in those positions into which they are prestressed by spring prestress, the activated nonreturn valve 146, as a partial valve of the switchable valve 134, blocks the return flow line section 148 for a return flow. The partial valve 142 of the switchable valve 132 likewise blocks the line section 148 for a return flow.

While the pump 116 conveys in the supply flow direction Z, the partial valve 140 of the switchable valve 132 is in the active position, i.e. in the return line section 148 in order to block said return line section 148 in the supply flow direction Z. The other switchable valve 134 blocks the return line section 148 in the return flow direction R owing to its activated partial valve 146 such that fluid pressure can build up in the fluid stores 120.

If both valves 132 and 134 are now switched such that the partial valves 144' and 140 are arranged in the return line section 148, hydraulic oil can flow from the hydraulic oil stores 120 via the common hydraulic line section 118*c* in the return line section 148 through the filter 128, the valves 132 and 134 and through the pump 116 back to the hydraulic oil tank 112.

If, for any reason, the nonreturn valve 130 provided in the supply line section 118*b* should become clogged and block off the line section 118*b* for any fluid flow, in the valve positions of the valves 132 and 134 illustrated in FIG. 2 hydraulic oil can be pumped via the line section 148 during emergency operation into the hydraulic oil stores 120 of the piston/cylinder units 122. As a result, the pistons 124 can be extended out of the cylinders 126. Compared with a fluid supply via the supply line section 118*b*, this takes place, however, whilst overcoming two or more points of flow resistance such that the useful component of the pumping power produced by the motor-operated pump 116 is reduced.

The flow loss when returning the hydraulic oil to the hydraulic oil tank 112 is largely unimportant since no pumping power is required for this purpose. Rather, the hydraulic oil is pushed from the piston out of the hydraulic oil store 120 to the hydraulic oil tank 112 owing to a load acting on the pistons which is being lowered owing to the influence of the force of its gravity. The flow losses thus produced in the hydraulic oil return line therefore need not be compensated for by drawing energy from an energy store on the industrial truck for the purpose of operating the motor 114.

For the sake of completeness, mention will be made of the fact that the hydraulic circuit in FIG. 2, as with the hydraulic circuit of the prior art in FIG. 1, has an outlet line 162 in which a manual outlet valve 164 is provided. The outlet line 162 is provided parallel to the supply line section 118*b* and to the return line section 148 and leads directly to the hydraulic oil tank 112.

Using the manually operable emergency outlet valve 164, it is possible in the case of complete failure of the valve control for the hydraulic oil to be let manually out of the hydraulic oil stores 120 to the hydraulic oil tank 112 and for a load lifted, for example, by the piston/cylinder units 122 to be reduced.

A pressure-limiting valve 166 is arranged such that it is always provided with the hydraulic oil pressure prevailing in the line system during a fluid movement during normal operation of the fluid circuit. In the case of a hydraulic oil pressure which exceeds a predetermined threshold pressure, the pressure-limiting valve 166 opens and lets hydraulic oil out directly into the hydraulic oil tank 112. The pump 116 is also connected directly to the hydraulic oil tank 112 via a nonreturn valve 168. This nonreturn valve 168, which blocks a hydraulic oil flow from the pump 116 to the fluid tank 112, but allows hydraulic oil to flow in the opposite direction, acts as a feed valve of the pump when lowering the load such that the pump 116, which is driven by hydraulic oil which is pushed by the pistons 124 via the pump 116 back into the hydraulic oil tank 112, does not produce excessive low pressure in the hydraulic oil in the lines 118 and 148 once conveying has been completed in the event of any hydraulic oil still flowing.

Indicated by dashed lines is a switching block 170 in which the valves 130, 132, 134, 136, 164, 166 and 168, the filter 128, the lines 118*b*, 148, 162 and sections of the lines 118*a* and 118*c* are arranged. The hydraulic oil lines, in which the valves 166 and 168 are arranged, are preferably likewise provided in the switching block 170. The switching block 170 may thus be preassembled in a simple manner as an assembly and installed in the industrial truck as a preassembled assembly.

Finally, reference is made to the line branch 172 which offers a connection option for further switching blocks or consumers. In the illustration shown in FIG. 2, no use is made of this option for the purpose of branching-off hydraulic oil.

The invention claimed is:

1. A fluid circuit for a load displacement device, having a fluid supply line, through which a fluid can be conveyed from a fluid tank by means of a fluid pump to at least one fluid store of a consumer, and having a fluid return line, through which fluid can be returned, driven by the consumer, from the at least one fluid store via the fluid pump to the fluid tank, a valve being provided in the fluid supply line, which valve allows fluid to pass through depending on the flow direction and allows a fluid supply flow to pass through from the fluid tank to the fluid store and blocks a fluid return flow from the fluid store to the fluid tank, the fluid circuit also comprising at least one switchable valve which can be switched between a return flow passage position in which it allows a fluid return flow to pass through and a return flow blocking position in which it blocks a fluid return flow, and the fluid circuit containing a fluid filter, wherein the fluid return line is formed separately from the fluid supply line at least in sections, the switchable valve and the fluid filter being provided in that section of the fluid return line which is separate from the fluid supply line, the switchable valve being arranged downstream of the fluid filter in the fluid return flow direction, further wherein, at least that section of the fluid supply line which is formed separately from the fluid return line, apart from the valve which allows fluid to pass through depending on the flow direction and the fluid line, is substantially free from further flow resistance.

2. The fluid circuit as claimed in claim 1, wherein a bypass line which bypasses the filter is provided in that section of the fluid return line which is separate from the fluid supply line, an emergency valve being provided in said bypass line and allowing a fluid return flow to pass through when the pressure difference between the valve end nearer to the fluid store and the valve end nearer to the fluid tank exceeds a predetermined threshold pressure and otherwise blocking a fluid flow.

3. The fluid circuit as claimed in claim 1, wherein the at least one switchable valve, in its return flow passage position, has a control nozzle and a nonreturn valve which is parallel to said control nozzle and allows fluid to pass through in dependence on the fluid pressure prevailing at the control nozzle.

4. The fluid circuit as claimed in claim 1, wherein the at least one switchable valve, in its return flow blocking position and as an emergency actuation valve, allows a fluid supply flow to pass through and blocks a fluid return flow.

5. The fluid circuit as claimed in claim 1, wherein a second switchable valve, which can be switched between at least two positions, is provided in that section of the fluid return line which is formed separately from the fluid supply line.

6. The fluid circuit as claimed in claim 5, wherein the second switchable valve can be switched between a supply flow passage position in which it allows a fluid supply flow to pass through and a supply flow blocking position in which it blocks a fluid supply flow.

7. The fluid circuit as claimed in claim 6, wherein the second switchable valve, in the supply flow blocking position and as an emergency outlet valve, allows a fluid return flow to pass through and blocks a fluid supply flow.

8. The fluid circuit as claimed in claim 6, wherein the second switchable valve, in its supply flow passage position, has an emergency actuation control nozzle and an emergency actuation nonreturn valve which is parallel to said emergency actuation control nozzle and allows fluid to pass through in dependence on the fluid pressure prevailing at the control nozzle in the supply flow direction.

9. An industrial truck having a load displacement device and having the fluid circuit for the purpose of operating the load displacement device as claimed in claim 1.

10. The industrial truck of claim 9, wherein the fluid circuit is implemented in a switching block as a preassembled assembly or an assembly which can be preassembled.

11. A switching block in a fluid circuit, the switching block comprising:

a first fluid line section, a second fluid line section which is separate from the first fluid line section, a valve being provided in the first fluid line section, which valve allows fluid to pass through depending on the flow direction, allows a fluid flow to pass through in a first flow direction and blocks a fluid flow in a second flow direction which is opposite to the first flow direction, at least one fluid filter, and a switchable valve being provided in the second fluid line section, said switchable valve being arranged downstream of the fluid filter in the second flow direction, and it being possible for said valve to be switched between a passage position in which it allows a fluid flow to pass through in the second flow direction, and a blocking position in which it blocks a fluid flow in the second flow direction, wherein, the first fluid line section, apart from the valve which allows fluid to pass through depending on the flow direction and the fluid line, is substantially free from further flow resistance.

* * * * *